(12) United States Patent
Clausen

(10) Patent No.: US 9,928,401 B2
(45) Date of Patent: Mar. 27, 2018

(54) SYSTEM AND METHOD OF BIOMETRIC ENROLLMENT AND VERIFICATION

(71) Applicant: IDEX ASA, Fornebu (NO)

(72) Inventor: Sigmund Clausen, Haugesund (NO)

(73) Assignee: IDEX ASA, Fornebu (NO)

( * ) Notice: Subject to any disclaimer, the term of this patent is extended or adjusted under 35 U.S.C. 154(b) by 0 days.

(21) Appl. No.: 15/487,589

(22) Filed: Apr. 14, 2017

(65) Prior Publication Data

US 2017/0220848 A1   Aug. 3, 2017

Related U.S. Application Data

(62) Division of application No. 14/789,331, filed on Jul. 1, 2015, now Pat. No. 9,684,813.

(51) Int. Cl.
*G06K 9/00* (2006.01)
*G06F 17/30* (2006.01)
(Continued)

(52) U.S. Cl.
CPC ..... *G06K 9/00087* (2013.01); *G06F 17/3028* (2013.01); *G06K 9/00026* (2013.01);
(Continued)

(58) Field of Classification Search
CPC ..... G01R 33/383; G01R 33/60; H01F 7/0284; G06K 9/00026; G06K 9/00087; G06K 9/00912; G06K 9/00926
(Continued)

(56) References Cited

U.S. PATENT DOCUMENTS 5,054,090 A   10/1991   Knight et al.
5,067,162 A   11/1991   Driscoll, Jr. et al.
(Continued)

FOREIGN PATENT DOCUMENTS

EP   081364 A1    12/1997
EP   1183638 A1   11/2000
(Continued)

OTHER PUBLICATIONS

Mainguet, Jean-Francois, "FingerChip: Prototypes & Products: FC 8×8 & FC 2×17," http://fingerchip.mainguet.org/products_fc2x17.htm, dated Oct. 11, 2015, 2 pages.
(Continued)

*Primary Examiner* — Manuchehr Rahmjoo
(74) *Attorney, Agent, or Firm* — Rothwell, Figg, Ernst & Manbeck, P.C.

(57) ABSTRACT

A system and method for biometric enrollment and verification compares a test biometric image (e.g., of a fingerprint) with each of a plurality of reference biometric images of one or more enrolled users. Verification of a user as an enrolled user is based on the cumulative amount of overlap between the test image and the reference images. The reference images are defined during an enrollment process by comparing a plurality of sample images, identifying overlapping data in each of the images, computing one or more quality measures, and storing at least a portion of the sample images. The enrollment process is deemed complete when each quality measures meets or exceeds an associated threshold.

3 Claims, 11 Drawing Sheets

(51) Int. Cl.
  *G06K 9/46* (2006.01)
  *G06K 9/62* (2006.01)
  *G06K 9/52* (2006.01)
(52) U.S. Cl.
  CPC ....... *G06K 9/00926* (2013.01); *G06K 9/4604* (2013.01); *G06K 9/52* (2013.01); *G06K 9/6201* (2013.01); *G06K 9/6293* (2013.01)
(58) Field of Classification Search
  USPC ........................................................ 382/124
  See application file for complete search history.

(56) References Cited

U.S. PATENT DOCUMENTS

| | | | |
|---|---|---|---|
| 5,426,708 A | 6/1995 | Hamada et al. | |
| 6,049,620 A | 4/2000 | Dickinson et al. | |
| 6,546,122 B1 | 4/2003 | Russo | |
| 6,719,200 B1 | 4/2004 | Wiebe | |
| 6,795,569 B1 | 9/2004 | Setlak | |
| 6,836,554 B1 | 12/2004 | Bolle et al. | |
| 6,895,104 B2 | 5/2005 | Wendt et al. | |
| 6,898,301 B2 | 5/2005 | Iwangana | |
| 6,980,673 B2 | 12/2005 | Funahashi | |
| 7,190,816 B2 | 3/2007 | Mitsuyu et al. | |
| 7,236,617 B1 | 6/2007 | Yau et al. | |
| 7,330,572 B2 | 2/2008 | Uchida | |
| 7,512,256 B1 | 3/2009 | Bauchspies | |
| 7,574,022 B2 | 8/2009 | Russo | |
| 7,599,530 B2 | 10/2009 | Boshra | |
| 7,616,787 B2 | 11/2009 | Boshra | |
| 7,634,117 B2 | 12/2009 | Cho | |
| 7,643,660 B1 | 1/2010 | Bauchspies | |
| 7,697,773 B1 | 4/2010 | Bauchspies | |
| 7,720,262 B2 * | 5/2010 | Svedin ................... | G06F 21/32 382/115 |
| 7,787,667 B2 | 8/2010 | Boshra | |
| 7,864,992 B2 | 1/2011 | Riedijk et al. | |
| 7,894,642 B2 | 2/2011 | Turvesson | |
| 7,912,256 B2 | 3/2011 | Russo | |
| 7,970,186 B2 | 6/2011 | Bauchspies | |
| 8,295,561 B2 * | 10/2012 | Kwan ...................... | G06K 9/03 382/124 |
| 8,638,994 B2 | 1/2014 | Kraemer et al. | |
| 8,711,105 B2 | 4/2014 | Gray et al. | |
| 9,135,494 B2 | 9/2015 | Boshra et al. | |
| 9,202,099 B2 | 12/2015 | Han et al. | |
| 2003/0029913 A1 | 2/2003 | Tsukamoto et al. | |
| 2007/0263912 A1 | 11/2007 | Biarnes et al. | |
| 2013/0181949 A1 | 7/2013 | Setlak | |
| 2013/0265137 A1 | 10/2013 | Nelson et al. | |
| 2014/0003681 A1 | 1/2014 | Wright et al. | |
| 2015/0071506 A1 | 3/2015 | Boshra et al. | |
| 2015/0131876 A1 | 5/2015 | Chang | |
| 2015/0264131 A1 | 9/2015 | Goldstein et al. | |
| 2016/0253547 A1 | 9/2016 | Bauchspies | |
| 2017/0004642 A1 | 1/2017 | Bauchspies | |
| 2017/0011540 A1 | 1/2017 | Bauchspies | |
| 2017/0017829 A1 | 1/2017 | Bauchspies | |

FOREIGN PATENT DOCUMENTS

| | | |
|---|---|---|
| EP | 1210695 A1 | 6/2002 |
| EP | 1317730 A1 | 6/2003 |
| EP | 1476846 A1 | 11/2004 |
| EP | 1150608 B1 | 12/2004 |
| EP | 1619622 A1 | 1/2006 |
| WO | WO 0049944 A1 | 8/2000 |
| WO | WO 02074168 A1 | 9/2002 |
| WO | WO 9852135 A2 | 11/2008 |

OTHER PUBLICATIONS

Wen-Hsing, Dr. Hsu, "Fingerprint sensing techniques," Powerpoint presentation, dated Sep. 20, 2007, 47 pages.
"FingerChip FC15A140: 500 dpi 0.06" × 0.55" fingerprint linear sensor," Thomson-CSF, dated Jul. 16, 1998, 16 pages.
Maltoni, David, et al., "Handbook of Fingerprint Recognition, Chapter 7, Biometric Fusion," Springer, London, Great Britain, pp. 303-339, (May 4, 2009).
Partial European Search Report issued in European Patent Application No. 16177135.7, 6 pages (Dec. 1, 2016).
Ito, Koichi et al., "A Fingerprint Matching Algorithm Using Phase-Only Correlation," IEICE Trans, Fundamentals, vol. E87-A, No. 3, pp. 682-691 (Mar. 2004).
Ito, Koichi et al., "A Fingerprint Recognition Algorithm Using Phase-Based Image Matching for Low-Quality Fingerprints," Japan, IEEE, pp. II-33-II-36, (2005).
Ito, Koichi et al., "A Fingerprint Recognition Algorithm Combining Phase-Based Image Matching and Feature-Based Matching," Springer-Verlag Berlin Heidelberg, ICB 2006, LNCS 3832, pp. 316-325 (2005).
Jain, Anil, Ross, Arun, "Fingerprint Mosaicking," Proceedings of IEEE International Conference on Acoustics, Speech, and Signal Processing (ICASSP), Orlando, Florida, 4 pages (May 13-17, 2002).
Moon, Y.S. et al., "Template Synthesis and Image Mosaicing for Fingerprint Registration: An Experimental Study," IEEE, pp. V-409-V-412, (2004).
Ross, Arun et al., "Image Versus Feature Mosaicing: A Case Study in Fingerprints," Proc. of SPIE Conference on Biometric Technology for Human Identification III, Orlando, USA, pp. 620208-1-620208-12, (Apr. 2006).
Tarar, Sandhya, Kumar, Ela, "Fingerprint Mosaicking Algorithm to Improve the Performance of Fingerprint Matching System," Computer Science and Information Technology 2(3) pp. 142-151, (2014).
Notice of Allowance issued in U.S. Appl. No. 14/789,331, 44 pages (dated Feb. 15, 2017).
Extended European Search Report issued in European Patent Application No. 16177135 13 pages (dated Mar. 2, 2017).
Maltoni, D., et al., "Chapter 4 Fingerprint Matching, Handbook of Fingerprint Recognition," Springer, London, GB, ISBN 978-1-84882-253-5, pp. 167-233 (Apr. 21, 2009).
Examination Report issued in European Patent Application No. 16 177 135.7, 4 pages (dated Jan. 31, 2018).

* cited by examiner

SYSTEM AND METHOD OF BIOMETRIC ENROLLMENT AND VERIFICATION

CROSS REFERENCE OF RELATED APPLICATION

This application is divisional application claiming the benefit under 35 U.S.C. § § 120, 121 of the filing date of non-provisional patent application Ser. No. 14/789,331 filed Jul. 1, 2015, the disclosure of which is incorporated herein by reference.

FIELD OF THE DISCLOSURE

This disclosure relates to systems and methods for enrolling biometric data in an enrollment database and for comparing the enrolled biometric data—called reference biometric data or information—with test biometric data or information for verifying the enrollment status of the test

BACKGROUND

Biometric systems are commonly used as an aid to confirming authorization for access to various types of resources or locations. Biometric systems measure various unique or nearly unique characteristics of a person's body to assist in confirming identity and, consequently, in authorizing an access requested by the person. The body characteristics, or biometric information, are measured by a biometric sensor, for example, a fingerprint sensor or an eye retinal scanner.

For the biometric system to authorize user access to a resource or location, the biometric information of the user has to be known by the biometric system and the biometric system has to verify the biometric information of the user when the user requests authorization. For the user to be known to the biometric system, the user will have to register or enrol its biometric information with the system. This process is often referred to as enrolment or registration. In the enrollment process, the biometric system receives biometric information from the biometric sensor and stores at least a portion of the biometric information to create a database of the biometric information. When verifying the user, the biometric system compares subsequently-received biometric information to the biometric information stored in the database, and if a sufficient match between the two is found the user is authorized to access the resource or location.

To enable biometric sensors to be incorporated onto smaller devices—e.g., smart phones—without taking up too much space on the device, and to minimize the costs of the sensor, sensors have become smaller and smaller. Thus, for example, a fingerprint sensor may image only a relatively small part of the user's finger, and the resulting fingerprint image is much smaller than the overall size of the finger surface. Some known methods reconstruct multiple smaller images into a large reference image. However, as images reconstruction is a lossy process due to e.g. elastic deformation of the fingerprint and limited sensor resolution, this introduces errors in the reference image. The enrollment and verification system will be able to verify the user only if data corresponding to the fingerprint image, i.e., the test image, is stored in the reference database in one or more of the reference images. If the test image corresponds to one part of the user's finger and the stored reference image(s) correspond to a different, non-overlapping part of the user's finger, the user cannot be verified.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure are embodied in a biometric identification method comprising storing a plurality of reference biometric images of an organic tissue of a user in a reference database, wherein each of the reference biometric images has a predefined image size and at least partially overlaps at least one of the other reference biometric images, and wherein all of the reference biometric images arranged with their overlapping portions aligned has an area greater than the predefined image size.

According to further aspects of the disclosure, storing the reference biometric images comprises providing a plurality of sample biometric images of the predefined image size from the user, comparing each of the sample biometric images with the other sample biometric images to identify overlapping data in the sample biometric images, computing an amount of unique, non-overlapping data in the sample biometric images; computing an amount of unique data relative to the predefined image size; arranging the plurality of biometric images with their overlapping portions aligned and computing the area of a bounding border encompassing the arranged biometric images relative to the predefined image size, and storing at least a portion of the plurality of sample biometric images as a plurality of reference biometric images in the reference database.

According to further aspects of the disclosure, the plurality of reference biometric images stored in the reference database comprises of number of biometric images that results in the amount of unique data relative to the predefined image size being equal to or greater than a first predefined threshold, and the area of the bounding border encompassing the arranged biometric images relative to the predefined image size being equal to or greater than a second predefined threshold.

According to further aspects of the disclosure, the method further comprises the step of computing compactness of the plurality of reference biometric images as the amount of unique data relative to the predefined image size divided by the area of the bounding border encompassing the arranged biometric images relative to the predefined image size.

According to further aspects of the disclosure, the method further comprises the step of comparing the compactness with a third predefined threshold.

According to further aspects of the disclosure, providing the sample biometric images comprises generating the sample biometric images with a biometric sensor.

According to further aspects of the disclosure, the organic tissue comprises a finger surface, and each reference biometric image comprises a fingerprint image, a feature set corresponding to the fingerprint image, or a combination of the fingerprint image and the feature set corresponding to the fingerprint image.

According to further aspects of the disclosure, storing the reference biometric images comprises (i) providing a sample biometric image, (ii) providing an additional sample biometric image, (iii) comparing the additional sample biometric image with each previously-provided sample biometric image to identify overlapping data in the additional sample biometric image and each previously-provided sample biometric image, (iv) computing one or more quality measures relating to the additional sample biometric image and each previously-provided sample biometric image, (v) comparing each computed quality measure with a threshold value associated with that quality measure, (vi) repeating steps (ii) through (v) until each quality measure meets or exceeds the associated threshold value, and (vii) storing the sample biometric images as reference biometric images when each quality measure meets or exceeds the associated threshold value.

According to further aspects of the disclosure, the quality measure comprises an amount of unique, non-overlapping data in the additional sample biometric image and each previously-provided sample biometric image, and computing an amount of unique data relative to the predefined image size.

According to further aspects of the disclosure, the method further comprises the step of arranging the additional sample biometric image and each previously-provided sample biometric image with their overlapping portions aligned, and the quality measure comprises the area of the bounding border encompassing the arranged biometric images relative to the predefined image size.

According to further aspects of the disclosure, the method further comprises the step of storing relative location information for two or more of the plurality of reference biometric images in the reference database.

According to further aspects of the disclosure, the method further comprises the steps of comparing a test biometric image with one or more of the reference biometric images to identify overlapping data in the test biometric image and each of the one or more reference biometric images, computing a cumulative amount of overlapping data in the test biometric image and the one or more reference biometric images, and verifying the user's identity based on the cumulative amount of overlapping data in the test biometric image and all of the reference biometric images.

According to further aspects of the disclosure, the method further comprises the step of generating the test biometric image with a biometric sensor.

According to further aspects of the disclosure, the organic tissue comprises a finger surface and the test biometric image comprises a fingerprint image.

According to further aspects of the disclosure, the method further comprises the step of verifying the user's identity based on the number of reference biometric images with which the test biometric image has overlapping data.

Further aspects of the disclosure are embodied in a method for verifying a user's identity based on a comparison of a test biometric image of a predefined image size obtained from the user with reference biometric image data stored in a reference database. The method comprises the steps of comparing the test biometric image with one or more of the reference biometric images to identify overlapping data in the test biometric image and each of the one or more reference biometric images, computing a cumulative amount of overlapping data in the test biometric image and the one or more reference biometric images, and verifying the user's identity based on the cumulative amount of overlapping data in the test biometric image and all of the reference biometric images.

According to further aspects of the disclosure, the method further comprises the step of generating the test biometric image with a biometric sensor.

According to further aspects of the disclosure, the organic tissue comprises a finger surface and the test biometric image comprises a fingerprint image.

According to further aspects of the disclosure, the organic tissue comprises a finger surface and wherein each reference biometric image comprises a fingerprint image, a feature set corresponding to the fingerprint image, or a combination of the fingerprint image and the feature set corresponding to the fingerprint image.

According to further aspects of the disclosure, the method further comprises the step of verifying the user's identity based on the number of reference biometric images with which the test biometric image has overlapping data.

Further aspects of the disclosure are embodied in a method for verifying a user's identity based on a comparison of a test biometric image obtained from the user with reference biometric data stored in a reference database. The reference biometric data comprises a plurality of reference biometric images of different portions of a surface of an organic tissue of the user, and each reference biometric image partially overlaps at least one other reference biometric image. The reference biometric data further comprises relative location information between each reference biometric image and at least one other reference biometric image. The method comprises the steps of comparing the test biometric image with one or more of the reference biometric images to identify a matching reference image having overlapping data with the test biometric image, determining relative location information between the test biometric image and the matching reference image, estimating areas of overlap between the test biometric image and the remaining reference biometric reference images based on the relative location information between the test biometric image and the matching reference image and the relative location information of the reference biometric data, and determining an amount of matching between the test biometric image and each of the remaining reference biometric images in each estimated area of overlap.

According to further aspects of the disclosure, the method further comprises the steps of computing a cumulative amount of overlapping data in the test biometric image and the reference biometric images and verifying the user's identity based on the cumulative amount of overlapping data in the test biometric image and all of the reference biometric images.

According to further aspects of the disclosure, the method further comprises generating the test biometric image with a biometric sensor.

According to further aspects of the disclosure, the organic tissue comprises a finger surface and the test biometric image comprises a fingerprint image.

According to further aspects of the disclosure, the method further comprises the step of verifying the user's identity based on the number of reference biometric images with which the test biometric image has overlapping data.

Aspects of the disclosure are further embodied in a method for verifying a user's identity based on a comparison of a test biometric image obtained from the user with reference biometric data stored in a reference database. The reference biometric data comprises a plurality of reference biometric images of different portions of a surface of an organic tissue of the user, and each reference biometric image partially overlaps at least one other reference biometric image. The reference biometric data further comprises relative location information between each reference biometric image and at least one other reference biometric image. The method comprises the steps of comparing the test biometric image with each of the reference biometric images to identify matching reference images having overlapping data with the test biometric image, determining relative location information between the test biometric image and each of the matching reference images, determining relative location information between each of the matching reference images based on the relative location information between the test biometric image and each of the matching reference images, and comparing the relative location information between each of the matching reference images determined based on the relative location information between the test biometric image and each of the matching reference images with the relative location information of the reference biometric data.

According to further aspects of the disclosure, the method further comprises the steps of computing a cumulative amount of overlapping data in the test biometric image and the reference biometric images and verifying the user's identity based on the cumulative amount of overlapping data in the test biometric image and all of the reference biometric images.

According to further aspects of the disclosure, the method further comprises the step of generating the test biometric image with a biometric sensor.

According to further aspects of the disclosure, the organic tissue comprises a finger surface and the test biometric image comprises a fingerprint image.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various, non-limiting embodiments of the present invention. In the drawings, common reference numbers indicate identical or functionally similar elements.

DETAILED DESCRIPTION

Figure 1:
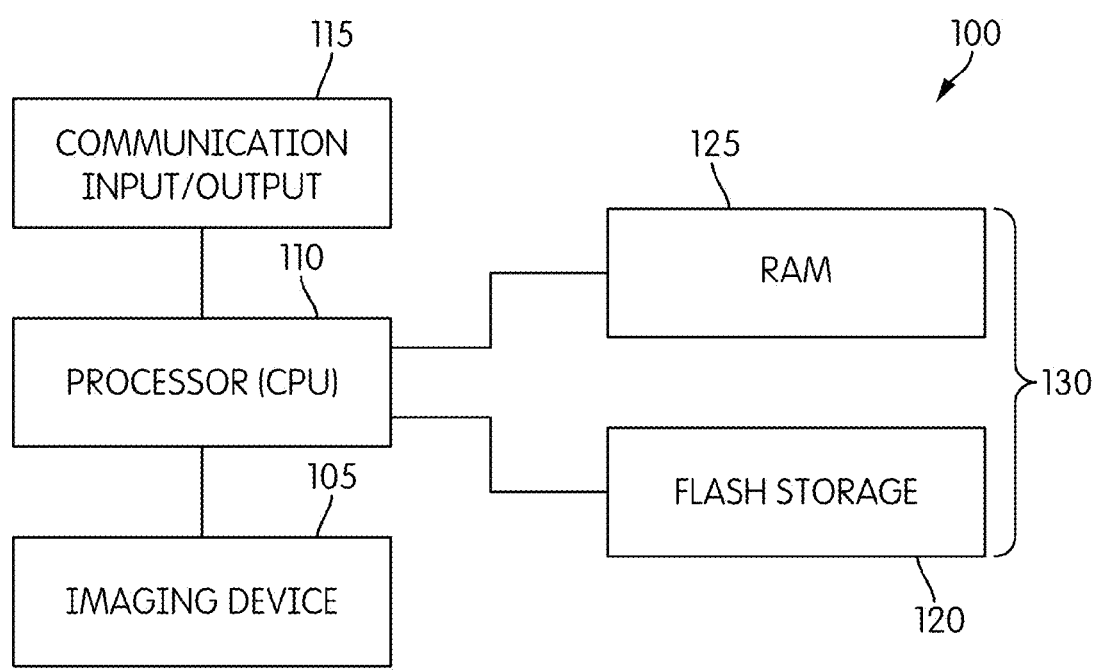
FIG. 1 is a schematic diagram of a biometric system according to an embodiment of the present invention.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

FIG. 1 is a block schematic diagram of an embodiment for a biometric enrollment and verification system 100. System 100 includes an imaging device 105, a processor 110, an input/output (I/O) communication system 115, a nonvolatile memory 120 and a RAM memory 125, with memory 120 and memory 125 collectively defining a memory system 130. System 100 is described as biometric verification system, wherein the system attempts to measure a correspondence between test biometric information and reference biometric information (one-on-one) in order to confirm identity of the test biometric information to the reference biometric information stored in a reference database. In the present context, "reference biometric information" or "reference biometric data" refers to biometric information or data, such as reference fingerprint data, that is stored for the various enrollees of the system, and "test biometric information" or "test biometric data," such as test fingerprint data, is the information that is provided to gain access and is compared to the reference biometric information to assess correspondence between the test biometric information and the reference biometric information to determine if the test biometric information corresponds to reference biometric information of one of the enrollees.

Processor 110 may include one or more central processing units (CPUs), such PC microprocessors or workstations interconnected to various other components, such as by a system bus (not shown). Exemplary PC microprocessors or workstations include the RISC System/6000 series available from International Business Machines Corporation (IBM) (RS/6000) (RISC System/6000 is a trademark of International Business Machines Corporation).

Imaging device 105 provides image data of an organic tissue, such as a fingerprint; either directly (i.e., it comprises a sensor or imager that generates image data) or by accessing a data structure or memory to obtain previously generated and stored image data. The image data may be of a reference fingerprint, i.e., reference biometric data, or of a fingerprint-under-test, i.e., test biometric data. Sensors that may be used as an imaging device 105 with system 100 for generating biometric image data include charge-coupled devices (CCD), complementary metal oxide semiconductor (CMOS), capacitive imaging devices, or other image generating devices. System 100 uses a fingerprint image, or other biometric image data, provided by the imaging device 105. In some cases, imaging device 105 may preprocess images, such as performing image keystone corrections (a geometric correction used to account for optical distortions associated with optical/prism based systems) when returning an image size proportionate to fingerprint size or perform image reconstruction to assemble an image taken in bands as a finger is 'swiped' across the sensor.

An operating system runs on processor 110, providing control and coordinating the functions of the various components of the system. The operating system may be one of the commercially available operating systems such as the AIX 6000 operating system or OS/2 operating system available from IBM (AIX 6000 and OS/2 are trademarks of IBM), Microsoft's Windows, Apple's MacOS, Google's Android, as well as UNIX and AIX operating systems. Custom programs, controlled by the system, are moved into and out of memory. These programs include the program described below in combination with programs for analyzing and comparing fingerprint-related data. Imaging device 105, I/O communication system 115, and memory system 130 is coupled to processor 110 via a bus and with memory system 130 including a Basic Input/Output System (BIOS) for controlling the basic system functions.

An input/output ("I/O") communication system 115 interconnects system 100 with outside devices or networks, enabling the system to communicate with other such systems over a communications medium (e.g., directly wired, Local Area Network (LAN), or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. In various embodiments, I/O devices (not shown) may also be connected to the system bus via I/O communication system 115. For example, a keyboard, a pointing device (e.g., mouse, trackball, or other pointing device), and a display or visual or auditory indicator may be interconnected to system 100 through I/O communication system 115. It is through such input devices that the user may interactively relate to the programs for manipulating the resources, images, subsystems, processes, and system described herein. By using the aforementioned I/O devices, a user is capable of inputting information to the system, e.g., through the keyboard or mouse, and receive output information from the system, e.g., from a display or indicator. The system may contain a removable memory component for transferring images, maps, instructions, or programs.

In an embodiment, system 100 compares image data for a live finger (i.e., test biometric information) to known (enrolled) image data (i.e., reference biometric information) stored in memory system 130. The enrollee databases of conventional biometric verification systems typically includes one reference image data from each finger of the enrollee. In an embodiment, system 100 stores multiple reference images from each finger, preferably of different parts of the each finger surface. In an embodiment, when comparing test image data for a live finger against reference image data in the database 130, system 100 tests the image data for the live finger (i.e., test biometric data or test image data) against multiple reference images from the same finger.

Figure 2:
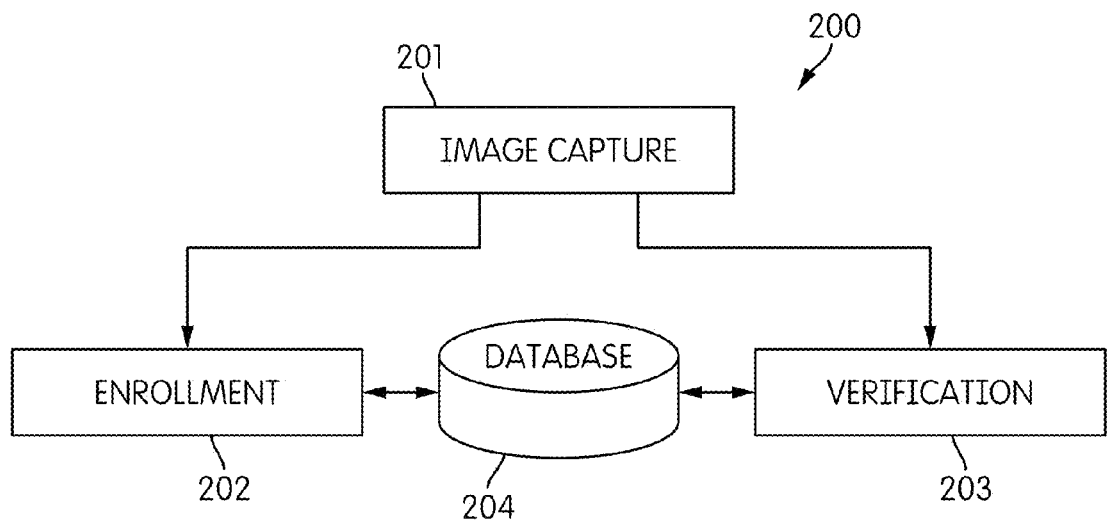
FIG. 2 is a top level schematic illustration of a biometric verification process according to an embodiment of the present invention.

FIG. 2 is a top level schematic illustration of an embodiment of a biometric enrollment and verification process 200. Process 200, executed by system 100 for example, includes three main processes: an image capture process 201, an enrollment process 202, and a verification process 203. During the image capture process 201 image data of an organic tissue, e.g., a fingerprint of a user, is provided, e.g., by imaging device 105, either directly from a sensor or imager that generates image data or by accessing a data structure or memory to obtain the image data. The image capture process 201 may preprocess images, such as by performing image keystone corrections (a geometric correction used to account for optical distortions associated with optical/prism-based systems) when returning an image size proportionate to fingerprint size or by performing image reconstruction to assemble an image from partial images generated as a finger is moved across the sensor.

The next step in the biometric enrollment and verification process 200 is an enrollment process 202 for enrolling the biometric information from the image data captured in image capture process 201 into a reference database 204 of the user's reference biometric information, as will be described in further detail below with reference to FIGS. 3-7. When the enrolment process 202 is successfully completed, a user's biometric reference data is stored in the biometric enrollment and verification system, and the user is enrolled or registered with the system.

When the user later requests access to a resource or location connected to the biometric enrollment and verification system, new biometric data (e.g., test image data) of the user's organic tissue is provided by the imaging device 105 during the image capture process 201, and the test image data is compared against the reference biometric information (e.g., reference image data) stored in the reference database 204 during the verification process 203. If a sufficient match between the reference image data and the test image data is found, the user is authorized access to the resource or location. The details of the verification process 203 are described in further detail below with reference to FIGS. 8-15.

Figure 3:
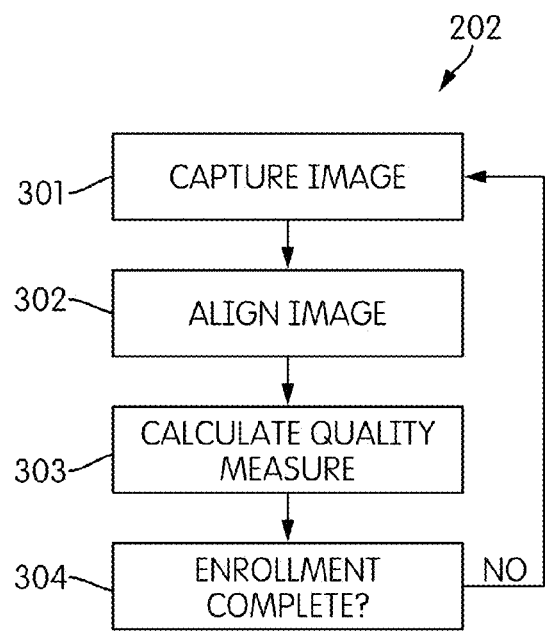
FIG. 3 is a flow chart of an enrollment process according to an embodiment of the present invention.

FIG. 3 is a flow chart of an embodiment of an enrollment process 202. The first step 301 of the enrollment process 202 is to collect a first sample image and a second sample image of the organic tissue for the prospective enrollee, e.g., by the image capture process 201. Then, in step 302 data of the second sample image is compared with data of the first sample image with a suitable matching algorithm to identify matching, or overlapping, portions of data comprising the two images. The matching algorithm aligns the two sample images by superimposing the data of the first and second sample images in such a manner that the matching or overlapping portions of the data of images coincide with each other, or, are "aligned" with each other. For example, alignment of two or more fingerprint images would superimpose the images so that the portions of the fingerprints captured in each image that are identical with portions of the fingerprints captured in the other image coincide with one another. With the two images aligned, the matching algorithm measures a relative location/position/orientation (e.g., translation and rotation) between the two sample images.

The matching algorithm may be any suitable matching algorithm, such as, a feature-based algorithm, a pattern-based algorithm, or a combination of feature-based and pattern-based algorithms. Feature based algorithms operate by first extracting a feature set from each of the sample images and by then comparing the feature sets against each other. Exemplary fingerprint features include, but are not limited to, minutiae (i.e., identifying characteristics of the fingerprints), fingerprint ridge/curvature, and combinations thereof. Pattern-based algorithms compare the patterns of each sample image against each other by image processing tools in real space or frequency space, such as, rotational invariant cross-correlation techniques and frequency-based methods using Fast Fourier Transform, Discrete Fourier Transform, and Wavelets.

Exemplary fingerprint matching algorithms are described in *Handbook of Fingerprint Recognition* by Davide Maltoni, Dario Maio, Anil K. Jain, and Salil Prabhakar (ISBN 978-1-84882-254-2).

The degree of overlap that is considered to be a "match" varies from algorithm to algorithm and also with the sensor size (image size). Minutiae-based recognition algorithms typically require a larger degree of overlap than pattern-based algorithms, simply due to a low density of minutiae points in some regions in many fingerprints. For a pattern-based matching algorithm to work, the common region typically needs to span 4-8 ridges, implying a common region of approximately 3×3 mm. Cross-correlation techniques, including phase correlation, typically needs a common area of at least 25% between two images to work robustly.

When the matching process is completed the sample images are stored in the reference database 204 as reference biometric data in the form of reference images. Each reference image may comprise an individual sample image, a feature set corresponding to the sample image, or a combination of the sample image and the feature set corresponding to the sample image. If one sample image does not contain unique information (i.e., it is partially or wholly redundant with a previously-stored reference image), it may be discarded to save memory resources. In various embodiments, the data relating to the relative location/position/orientation between the reference image and one or more other reference images is also stored in the reference database 204.

The third step 303 of the enrollment process 202 is to calculate a quality measure of the reference images created in step 302. This calculation is described below.

The enrollment process then continues to step 304 where it is decided if the enrollment process is completed for the prospective enrollee. In one embodiment, the enrollment process 202 stops when the quality measure of the reference images calculated for the prospective enrollee in step 303 exceeds a predefined quality threshold. In addition, it is also possible to take into consideration the number of images and/or feature sets in the reference database for the prospective enrollee. Thus, in one embodiment the enrollment process 202 may stop when the quality measure of the reference image data for the prospective enrollee exceeds the predefined quality threshold or when the number of images and/or feature sets in the reference database for the prospective enrollee exceeds a predefined minimum number of images. If it is determined that the enrollment process 202 is not completed for the prospective enrollee, the processes returns to step 301 to collect a third sample image of the prospective enrollee. In step 302, the third sample image is compared with all reference images for the prospective enrollee in the reference database 204, e.g., the first and second reference images, to align the third sample image with the previously-stored reference image(s) and to compute a relative location/position/orientation between the third sample image and each reference image.

Thereafter, the third sample image (i.e., the image itself and/or a feature set of the third sample image) is stored, optionally along with data relating to the location/position/orientation of the third sample image with respect to other reference images, in the reference database 204 as additional biometric reference data Steps 303 and 304 are repeated and if the predefined quality threshold and/or image limit are met, the enrollment process is complete for the prospective enrollee. If the predefined quality threshold and/or image limit are not met in step 304, process 202 will repeat for a fourth (an optionally fifth, sixth seventh, etc.) sample image for the prospective enrollee until the predefined quality threshold and/or image limit are met or some other stop parameter is reached.

Calculation of the quality measure, step 303, is described as follows. The quality measure of the reference image(s) may comprise a single calculated quality measure, or it may comprise a combination of any two or more of a plurality of calculated quality measures.

A first quality measure that may be calculated in step 303 is the total area of unique image information, $A_{unique}$, that is in the stored reference image(s) for a prospective enrollee. $A_{unique}$, is a measure of the amount of unique information within the biometric reference data for a particular enrollee relative to the sensor size, which corresponds to the size of a single image. Information or data is "unique" if it is not already contained in other reference data stored in the reference database 204. In that regard, "unique" data may also be thought of as non-redundant data. For example, if the database consists of one reference image for a prospective enrollee, then $A_{unique}=1$, since the entire reference image corresponding to the size of the sensor consists of unique data. If the reference database 204 consist of two identical reference images for the prospective enrollee, then $A_{unique}=1$ since the amount of unique data contained in the cumulative data of the two images still corresponds to the size of the sensor (i.e., a single image). On the other hand, if the reference database 204 consists of two reference images have no overlapping areas, then $A_{unique}=2$ since the amount of unique data corresponds to two images, i.e., twice the size of the sensor.

Figure 5A:
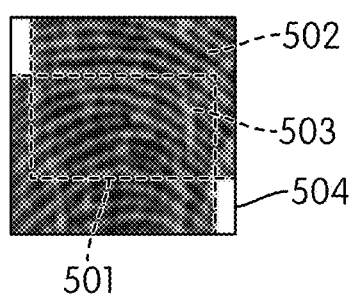

A second quality parameter of the reference images that may be computed in step 303 for a prospective enrollee is the area of a bounding box, $A_{box}$, encompassing a cluster of aligned reference images relative to the sensor size. If there are more than one cluster of reference images, the area of the bounding box encompasses the largest cluster of reference images. For example, FIG. 5(a) shows two reference images 501, 502 that are aligned with one another and have an area of matching or overlapping data represented by area 503. $A_{unique}$ for images 501, 502 would be the area of image 501, plus the area of image 502, less the area of overlap 503. Note that, as aligned, image 502 is shifted up and to the right relative to image 501. The bounding box corresponds to box 504 that encompasses the aligned images 501, 502, and $A_{box}$ is the area of box 504. While box 504 is substantially square, it is not a requirement that the box encompassing the reference images be square or even rectangular. A bounding "box" may be a bounding border, or a convex hull or convex envelope, of any shape, e.g., square, rectangular, oval, circular, triangular, polygonal, etc., which encompasses all the reference images and for which an area of the encompassing border can be determined.

To ensure that the data of a test image of an enrolled user corresponds to reference data stored for that user, the reference images stored for the enrolled user encompass a substantial part of the user's finger that is larger (possibly much larger) than the size of the sensor (i.e., a single image), and there are no data gaps between reference images.

To ensure that the reference database does not have large holes, or areas with missing information, is it useful to calculate a third quality measure, the compactness of the cluster of reference images. If there is more than one cluster for reference images, then the compactness is a measure of the compactness of the largest of the clusters of reference images. The compactness of an enrollee's reference data in the reference database, hereinafter referred to as Compactness, is defined as the ratio of total area of unique information contained in the reference images stored for the enrollee to the area of the bonding box encompassing the largest cluster of reference images, that is $A_{unique}/A_{box}$.

Since the area of unique data can never exceed the area of a box bounding the reference images, $A_{unique}/A_{box}$ can never be greater than 1.0. As $A_{unique}/A_{box}$ approaches 1.0, this means that a larger proportion of the data contained within a box bounding the reference images is unique data, and thus there are relatively few gaps in the reference data. On the other hand, as $A_{unique}/A_{box}$ becomes more and more less than 1.0, this means that a smaller proportion of the data contained with a box bounding the reference images is unique data, and thus there may be relatively large gaps in the unique data in the reference data. Thus, it is preferable that the compactness $A_{unique}/A_{box}$ be close to 1.0.

FIGS. 4-7 illustrate an exemplary enrollment process where thresholds of the quality measure of the reference database are set to $A_{unique}>3$ (relative to sensor size), and Compactness>0.8. For ease of illustration only, the reference images are shown as a stitched reference image, but stitching reference images is not necessarily required in the process described herein. On the contrary, in one embodiment it is only necessary to measure the relative locations of the aligned reference images; it is not necessary to stitch the reference images together. The measurement of relative location involves calculating the translation (dx, dy) and rotation (dΘ) between the reference images.

The relative locations, or spatial correspondences between the images, can be used to guide the prospective enrollee during the enrollment process 202. Knowing where each reference image belongs relative to the other reference images enables the system 100 to calculate the total size of the unique image data enrolled so far in the image database 204. Also the total image information enrolled so far can be quantified in terms of quality measures, such as, compactness, size of region with holes (i.e., lack of unique data), etc. This information can be used in step 304 to determine when the enrollment process 202 is complete.

Figure 4A:
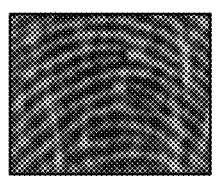
FIGS. 4A-7B illustrate an exemplary enrollment process according to an embodiment of the present invention.
Figure 4B:
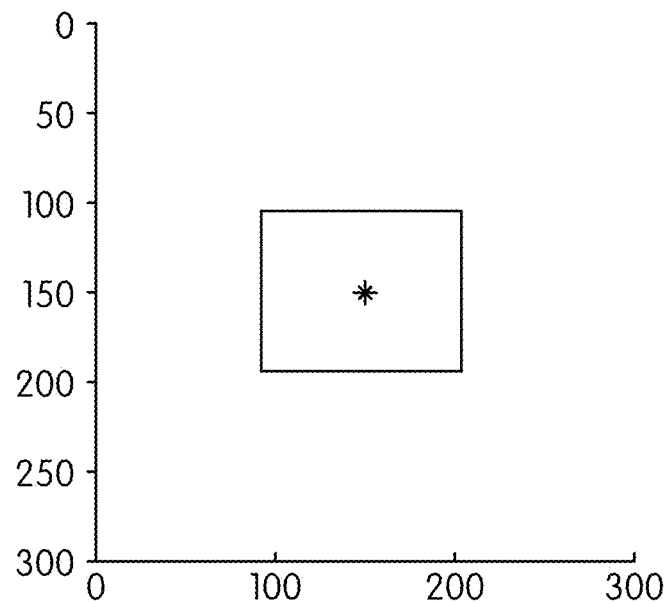

FIG. 4(a) show the result after the first reference image, $A_{unique}=1$ (the amount of unique information is equal to the sensor size), $A_{box}=1$, and Compactness $A_{unique}/A_{box}=1$. FIG. 4(b) shows a bounding box, which, in this case corresponds to the single image or sensor, on an x-y Cartesian coordinate system with an asterisks (*) indicating the center of the single image.

Figure 5B:
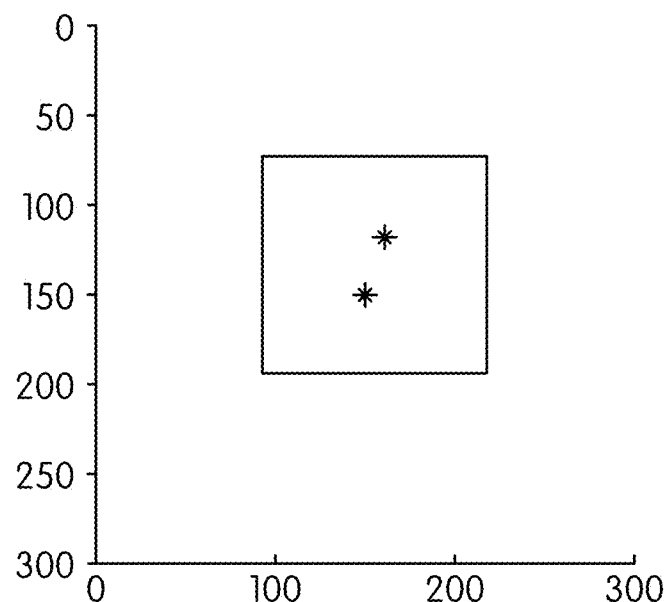

FIG. 5(a) shows the result after a second, partially overlapping reference image 502 is combined with first reference image 501 in the reference database. FIG. 5(b) shows the bounding box 504 and the centers (*) of reference images 501, 502 in the Cartesian coordinate system. The portion of image 502 overlapping with image 501, as represented by rectangle 503 in FIG. 5(a), is not unique as that data was stored in the reference database as part of image 501, but the portion of second image 502 that is outside the rectangle 503 is unique. Thus, the amount of unique data exceeds the amount of data that is stored in a single image, and $A_{unique}=1.43$. The area of bounding box 504 that encompasses the aligned images 501, 502, $A_{box}=1.51$, and the Compactness $A_{unique}/A_{box}=0.95$.

Figure 6A:
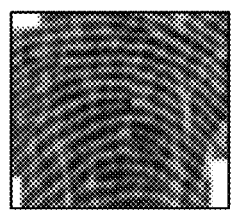
Figure 6B:
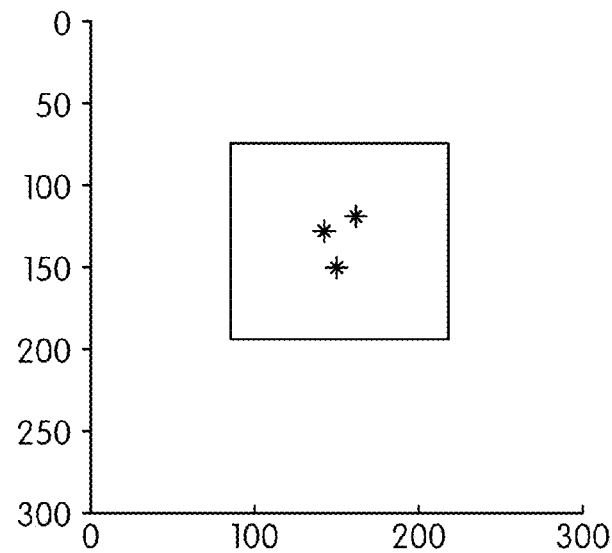

FIG. 6(a) shows the result after a third reference image, partially overlapping the first and second reference images is combined with first and second reference images in the reference database. FIG. 6(b) shows the bounding box and the centers (*) of first, second, and third reference images in the Cartesian coordinate system. For the results shown in FIGS. 6(a) and 6(b), $A_{unique}=1.53$, $A_{box}=1.61$, and Compactness $A_{unique}/A_{box}=0.95$.

Figure 7A:
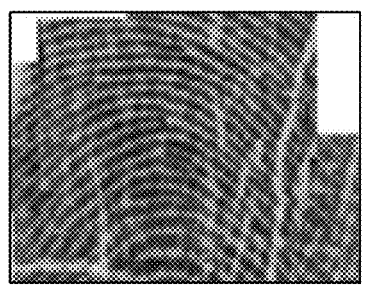
Figure 7B:
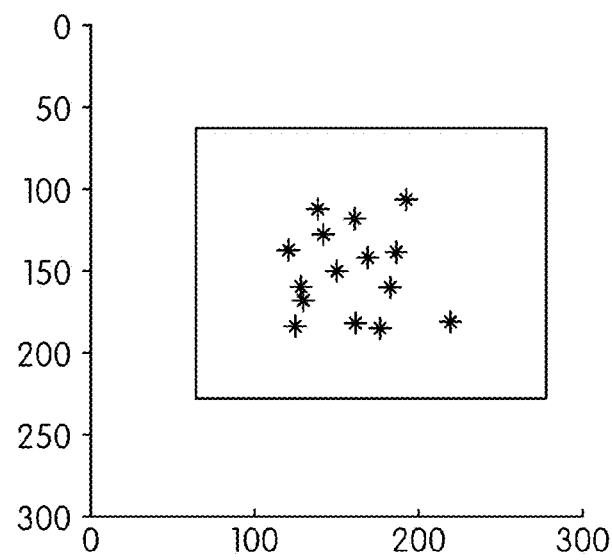

FIGS. 7(a) and 7(b) show the result after the quality measure thresholds of the reference database were exceeded and the enrollment was completed after 15 sample images had been captured. Here $A_{unique}=3.2$, $A_{box}=3.51$, and Compactness $A_{unique}/A_{box}=0.91$. In exemplary data capture shown in FIG. 7, nine of the sample images were discarded and not saved as reference images as they did not contain unique information, thus the final reference database consist of six ($D_{ri}=6$) individual reference images. The final reference data stored in the reference database for the enrollee may consist of six individual grayscale images, six individual feature sets, or a combination of the grayscale images and feature sets.

Figure 8:
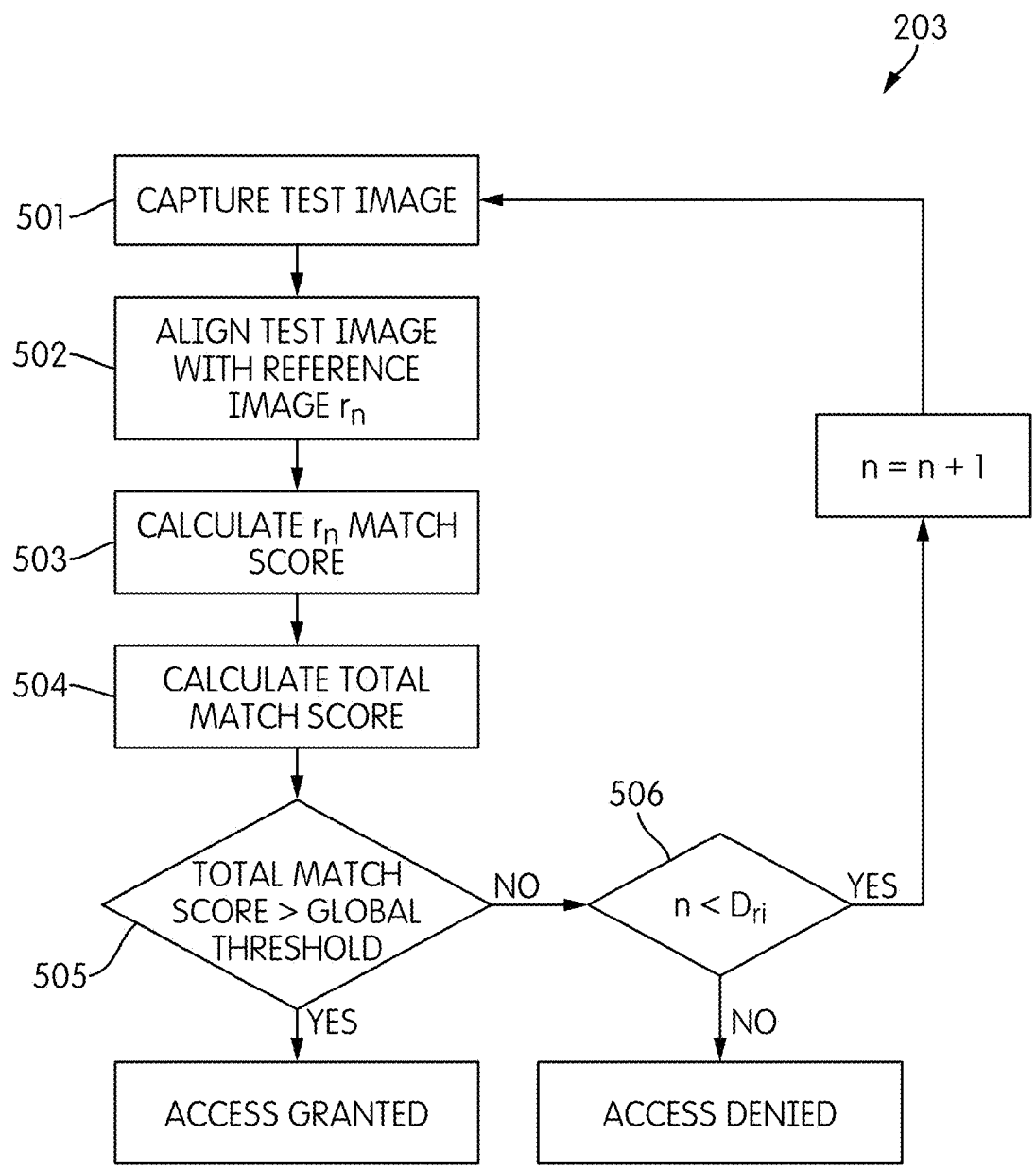
FIG. 8 is a flow chart of a verification process according to an embodiment of the present invention.

FIG. 8 is a flow chart of an embodiment of a verification process 203. The first step 501 of the verification process 203 is to capture test biometric data in the form of a test image, e.g., by the image capture process 201. Then, in step 502, the test image is aligned with reference image $r_n$, where $1 \leq n \leq D_{ri}$, from reference database 204 using a suitable matching algorithm (where $D_{ri}$ is the total number of reference images in the reference database 204 for an enrollee). Where the biometric information is fingerprint image data, $D_{ri}$ may refer to the number of reference fingerprint images for each finger—which may not be the same for each finger—of each enrollee in the system. The matching algorithm may be a feature-based algorithm, a pattern-based algorithm, or a combination of feature-based and pattern-based algorithms. Feature-based algorithms are based on first extracting a feature set from each of the sample images and then comparing the feature sets against each other. Exemplary fingerprint features includes, but are not limited to, minutiae, fingerprint ridge/curvature, and combinations thereof. Pattern-based algorithms compare the patterns of each sample image against each other by image processing tools in real space or frequency space, such as rotational invariant cross-correlation techniques and frequency based methods using Fast Fourier Transform, Discrete Fourier Transform, and Wavelets.

When the alignment (step 502) is completed, process 203 continues to step 503 where a match score between the test image and reference image $r_n$ is calculated. In one embodiment, the match score is the percentage of the test image data that matches the reference image data $r_n$.

The verification process 203 then continues to step 504 where a total match score is calculated. In one embodiment, the total match score equals the percentage of the test image data that matched the reference image data in the reference database 204. That is, the total match score is the total, cumulative percentage of matching unique image data between the test image and all the reference images in the reference database 204.

In step 505, the verification process checks if the total match score exceeds a predetermined global threshold. If the total match score exceeds the global threshold, then the verification process 203 is successful and the user is authorized access to the resource or location. If the total match score does not exceed the global threshold, then the verification process 203 continues to step 506.

In step 506, the verification process checks if there are more reference images in the reference database 204 to match against the test image, that is, if $n<D_{ri}$. If more reference images are available, then n is increased to n+1 and the process returns to step 502. If, on the other hand, n=Dri, then the verification process 203 is unsuccessful, and the user is denied access to the resource or location.

In one embodiment, the relative locations between the reference images or feature sets are discarded when the enrollment process is completed. In another embodiment, the relative locations between the reference images or feature sets are stored in the reference database. In an embodiment where the relative locations between the reference images or feature sets are stored in the reference database 204, another measure may be included in the total match score, a measure of the relative location between the matching test image and reference images. As mentioned above, for the verification process to be successful, the relative locations measured in the verification process have to be within a predefined threshold of the relative locations stored in the reference database.

For example, during the verification process a test image might match reference images 1 and 2. The relative location information from the enrollment process indicates that these two reference images also match each other and are rotated 30 degrees with respect to each other. The relative location information also indicates that reference images 1 and 2 are translated with respect to each other by 30 pixels in the X-direction and by 50 pixels in the Y-direction. If this relative location information is not compatible with the results from matching the test image with the same two reference images, the matching results are likely to be incorrect. Thus, the stored relative location information works as a second verification step that can make the matches more robust.

In principle one test image can match many reference images, which strengthens the matching result. However, in many cases the overlap between test and reference images is really small, making the overall matching result uncertain. Thus, it various embodiments, it is advantageous to have a final step where all location information from the verification process is compared with all relevant location information from the enrollment process In a further embodiment, the total match score also includes a measure of the number of reference images with a successful match with the test image. This additional measure may add additional security in case there is a very good match between the test image and only one reference image and no match with any of the other reference images. In this case, the one very good match may result in a total match score that exceeds the global threshold of the total percentage of matching unique image information. If the test image is much smaller than the area of a regular fingerprint, it is possible that the test image is not a very good match with the rest of the reference images in the reference database 204. When a second threshold of a minimum number of successful reference image matches is included in the total match score, the possibility of falsely verifying the test image is greatly reduced.

Figure 9:
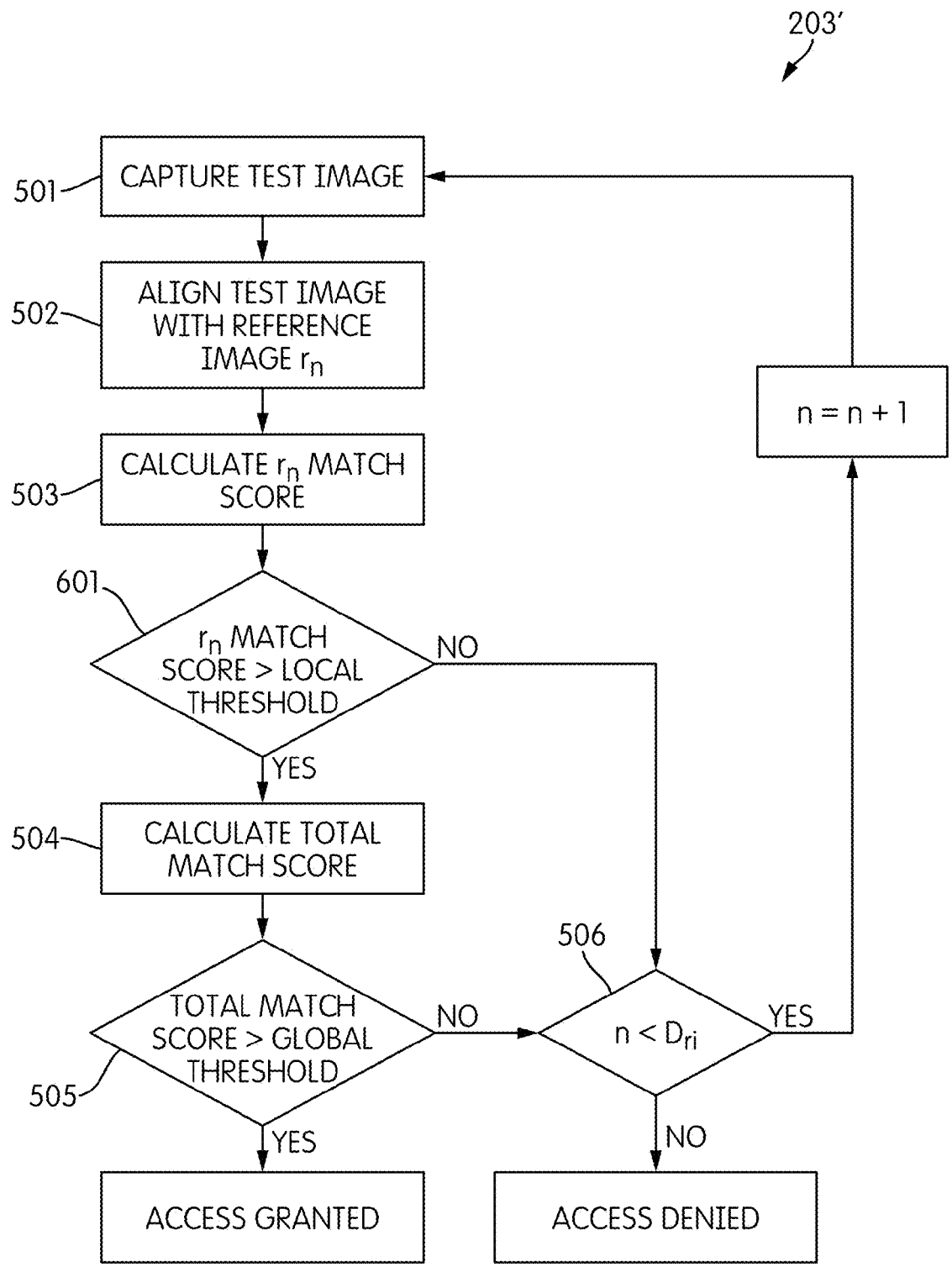
FIG. 9 is a flow chart of a verification process according to another embodiment of the present invention.

FIG. 9 is a flow chart of an alternative embodiment of a verification process 203' that involves more than one threshold comparison for increased security. As in verification process 203 of FIG. 8, first step 501 of the verification process 203' is to capture test biometric data in the form of a test image, e.g., by the image capture process 201. Then in step 502 the test image is aligned with reference image $r_n$, where $1 \leq n \leq D_{ri}$, from reference database 204 using a suitable matching algorithm (where $D_{ri}$ is the total number of reference images in the reference database 204).

When the alignment (step 502) is completed, process 203' continues to step 503 where a match score between the test image and reference image $r_n$, is calculated. For process 203', the match score calculated in step 503 will be referred to as an image match score, as it is the match score for just the single reference image $r_n$.

In step 601, the image match score between the test image and reference image $r_n$ is compared to a local threshold. If the image match score does not meet or exceed the local threshold, process 203' proceeds to step 506 to check if there are more reference images in the reference database 204 to match against the test image, that is, if $n<D_{ri}$. If more reference images are available, then n is increased to n+1 and the process returns to step 502. If, on the other hand, n=Dri, then the verification process 203 is unsuccessful, and the user is denied access to the resource or location.

If the image match score does meet or exceed the local threshold, verification process 203' then continues to step 504 where a total match score is calculated.

In step 505, the verification process 203' checks if the total match score meets or exceeds the global threshold. If the total match score meets or exceeds the global threshold, then access is granted. If the total match score does not meet or exceed the global threshold, then the verification process 203' continues to step 506 to check if there are more reference images in the reference database 204 to match against the test image, that is, if $n<D_{ri}$. If more reference images are available, then n is increased to n+1 and the process returns to step 502. If, on the other hand, n=Dri, then the verification process 203 is unsuccessful, and the user is denied access to the resource or location.

Step 601 improves the efficacy of the verification process 203' as steps 504 and 505 are performed only if there is a sufficient match between the test image and the particular reference image $r_n$ so that the image match score meets or exceeds the local threshold.

FIGS. 10-15 illustrate an exemplary verification process using the exemplary reference database created with reference to FIGS. 4-7.

Figure 10A:
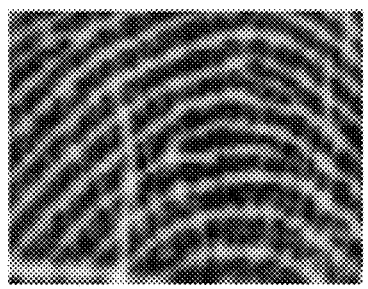
FIGS. 10A-15D illustrate an exemplary verification process according to an embodiment of the present invention.
Figure 10B:
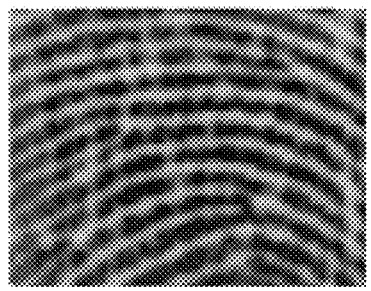
Figure 10C:
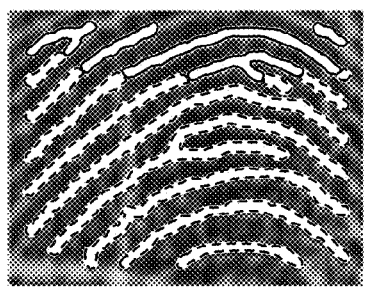
Figure 10D:
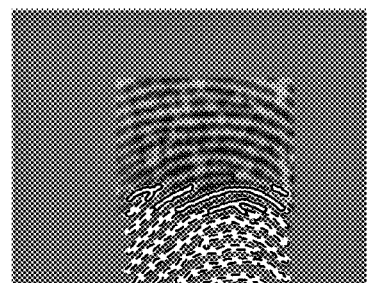

FIG. 10 visually illustrates the result of a match process between a test image (FIG. 10(a)) and a first reference image r₁ (FIG. 10(b)). Overlap between reference image r₁ and the test image is shown in the FIG. 10(d). Matching features between the two images are shown in solid lines, non-matching features of the test image are shown in dashed lines, and non-matching features of the first reference image are shown in greyscale. FIG. 10(c) illustrates the cumulative matching of the test image with the reference image, again, with matching features shown in solid lines, nonmatching features of the test image shown in dashed lines, and non-matching features of the reference image shown in greyscale. That is, FIG. 10(c) is a graphic representation of the total match score between the test image (FIG. 10(a)) and all reference images of the reference database that have thus far been tested (i.e., reference image FIG. 10(b)). After the first reference image, the total match score is identical to the match score (of, e.g., 22% in FIG. 10) between the test image and reference image $r_1$ (FIG. 10(b)).

Figure 11A:
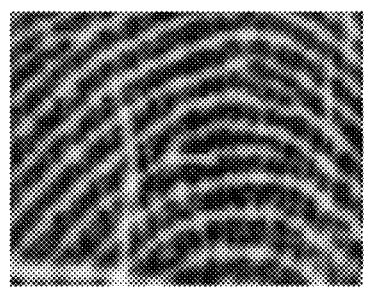
Figure 11B:
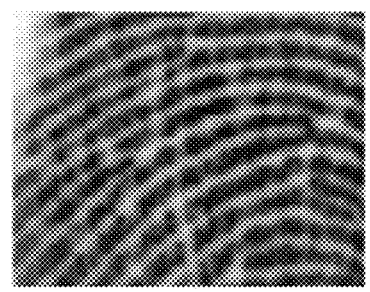
Figure 11C:
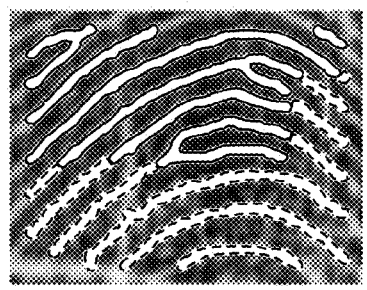
Figure 11D:
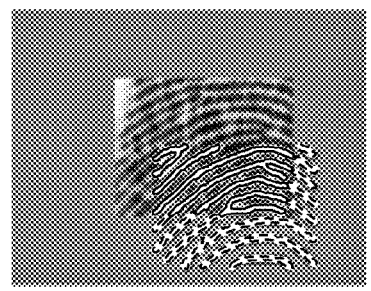

FIG. 11 visually illustrates the result of a match process between the same test image (now shown in FIG. 11(a)) and a second reference image $r_2$ (FIG. 11(b)). Overlap between reference image $r_2$ and the test image is shown in the FIG. 11(d) with matching features indicated by solid lines, non-matching features of the test image indicated by dashed lines, and non-matching features of the second reference image shown in greyscale. FIG. 11(c) now shows a total match score of 56% between the test image (FIGS. 10(a) and 11(a)) and reference images $r_1$ (FIG. 10(b) and $r_2$ (FIG. 11(b)).

Figure 12A:
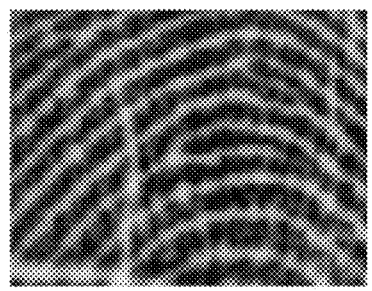
Figure 12B:
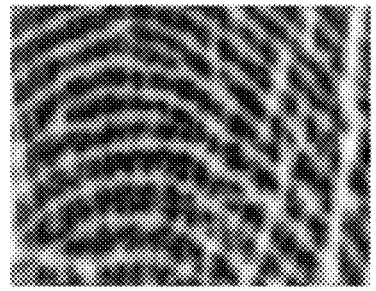
Figure 12C:
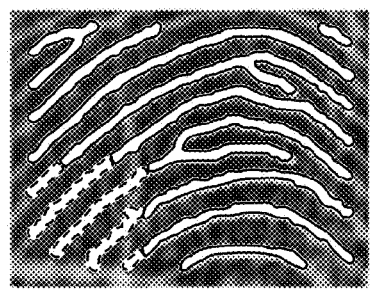
Figure 12D:
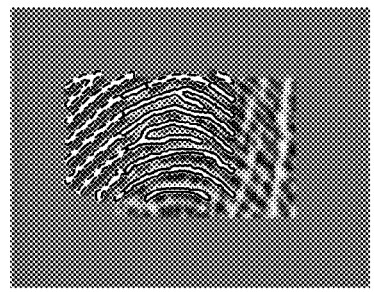

FIG. 12 visually illustrates the result of a match process between the same test image (now shown in FIG. 12(a)) and a third reference image $r_3$ (FIG. 12(b)). Overlap between reference image $r_3$ and the test image is shown in FIG. 12(d) with matching features indicated by solid lines, non-matching features of the test image indicated by dashed lines, and non-matching features of the third reference image shown in greyscale. FIG. 12(c) now shows a total match score of 87% between the test image (FIGS. 10(a), 11(a), 12(a)) and the three reference images $r_1$ (FIG. 10(b)), $r_2$ (FIG. 11(b)), and $r_3$ (FIG. 12(b)).

Figure 13A:
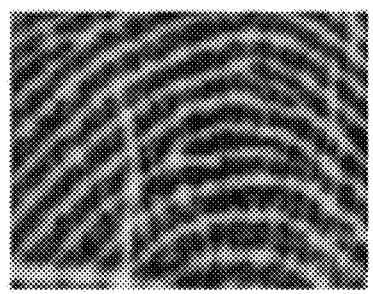
Figure 13B:
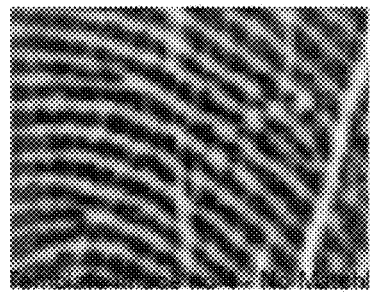
Figure 13C:
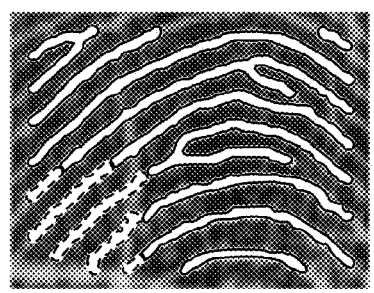
Figure 13D:
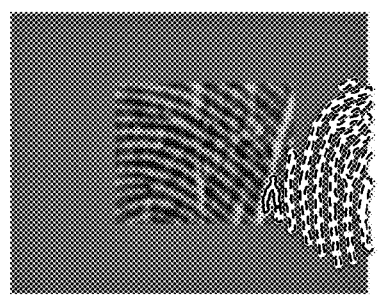

FIG. 13 visually illustrates the result after a match process between the same test image (now shown in FIG. 13(a)) and a fourth reference image $r_4$ (FIG. 13(b)). Overlap between reference image r4 and the test image is shown in FIG. 13(d) with matching features indicated by solid lines, non-matching features of the test image indicated by dashed lines, and non-matching features of the fourth reference image shown in greyscale. In the case of the match process with the fourth reference image shown in FIG. 13, there is not sufficient overlap between the test image and the reference image $r_4$ to align the images. Hence, FIG. 13(c) shows an unchanged total match score of 87% between the test image (FIGS. 10(a), 11(a), 12(a), 13(a)) and the four reference images $r_1$ (FIG. 10(b)), $r_2$ (FIG. 11(b)), $r_3$ (FIG. 12(b), and $r_4$ (FIG. 13(b)) as compared to the total match shown in FIG. 12(d).

Figure 14A:
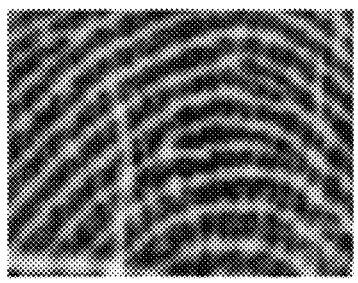
Figure 14B:
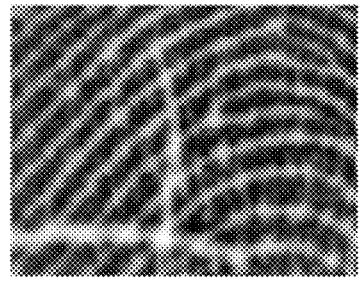
Figure 14C:
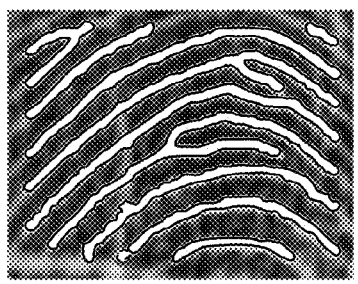
Figure 14D:
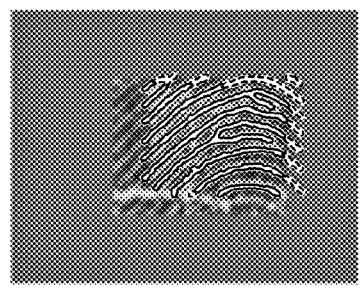

FIG. 14 visually illustrates the result of the match process between the same test image (now shown in FIG. 14(a)) and the fifth reference image $r_5$ (FIG. 14(b)). Overlap between reference image $r_5$ and the test image is shown in FIG. 14(d) with matching features indicated by solid lines, non-matching features of the test image indicated by dashed lines, and non-matching features of the reference image shown in greyscale. FIG. 14(c) now illustrates a total match score of 99% between the test image (FIGS. 10(a), 11(a), 12(a), 13(a), 14(a)) and the five reference images $r_1$ (FIG. 10(b)), $r_2$ (FIG. 11(b)), $r_3$ (FIG. 12(b), $r_4$ (FIG. 13(b), and $r_5$ (FIG. 14(b)).

Figure 15A:
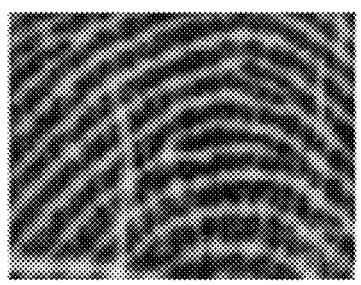
Figure 15B:
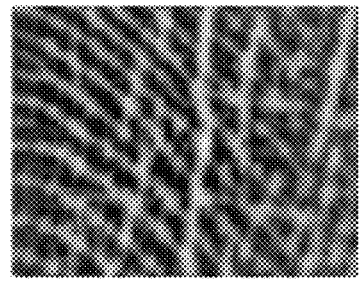
Figure 15C:
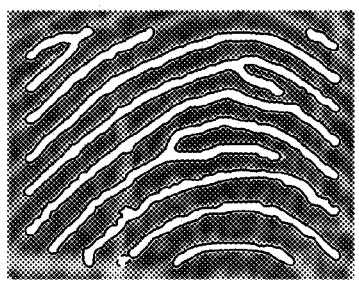
Figure 15D:
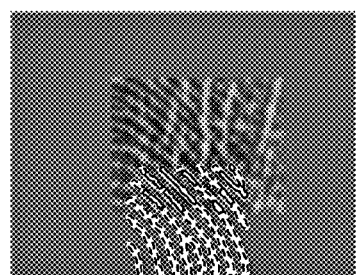

FIG. 15 visually illustrates the result of the match process between the same test image (FIG. 15(a)) and the sixth reference image $r_6$ (FIG. 15(b)). Overlap between reference image $r_6$ and the test image is shown in FIG. 15(d) with features matching the test image indicated by solid lines, non-matching features of the test image indicated by dashed lines, and non-matching features of the sixth reference image shown in greyscale. As was the case for reference image $r_4$ (FIG. 13), there is not enough overlap between the test image and the sixth reference image $r_6$ to align the images and calculate a match score. Hence, the FIG. 15(c) shows an unchanged and final total match score of 99% between the test image and the six reference images of the reference database.

In one embodiment, the verification process 203 may keep track of the number of times a reference image is successfully matched with a test image. Then, if a reference image has not been successfully matched with a test image after a predetermined number of test images, the verification process may remove the reference image from the reference database 204.

In one embodiment, the verification process 203 may evaluate the quality of test images that are verified by the verification process 203. One measure of high quality could be a match score with all of the reference images in the reference database. A test image might match almost all other images but the overlap with each image could be relatively small. Thus, when the verification process 203 finds a high quality test image, the verification process 203 may add the test image as a reference image to the reference database. The high quality test image contains "new" image information condensed into one individual template image, and adding that image to the reference database will in general increase the probability of a correct match.

In various embodiments, the relative location information can be used in the verification process 203 where a certain test image is matched against all enrolled reference images. Knowing the spatial correspondences between the reference images from the enrollment process 202, the matching result between the test image and the reference images can be checked with respect to consistency. For instance, if a match is found between a test image and several reference images, but the relative placement detected among the reference images matching the test image is not consistent with the location information from the enrollment process 202, the match may be disregarded.

Various alternatives for employing the relative location information of the reference images and the test image during the verification process are illustrated in FIGS. 16-19.

Figure 16:
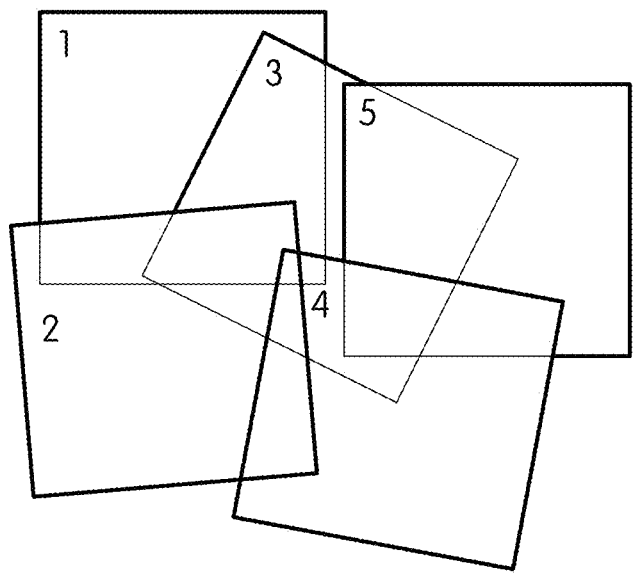
FIG. 16 is a graphic representation of a set of reference images stored in a reference database, including spatial correspondence between the reference images.

FIG. 16 is a graphic representation of a set of reference images 1-5 stored in a reference database. The reference images themselves are stored, as is the relative location information, or spatial correspondence, of the reference images with respect to each other.

Figure 17:
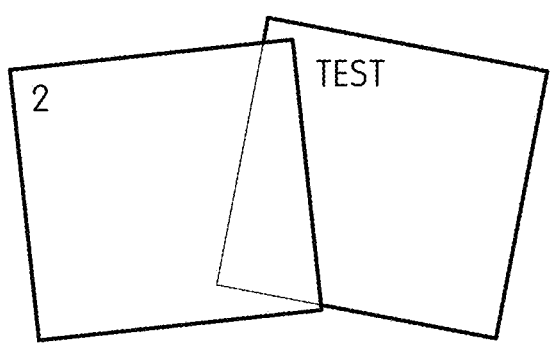
FIG. 17 is a graphic representation of a partial match between a test image and a reference image, including the spatial correspondence between the test image and the reference image.

FIG. 17 is a graphic representation of a partial match between a test image and reference image 2, including the spatial correspondence between the test image and reference image 2.

Figure 18:
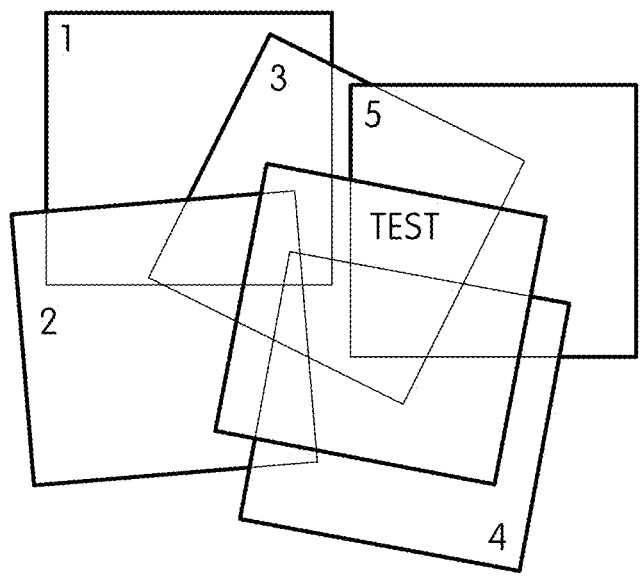
FIG. 18 is a graphic representation of a first alternative for employing relative location information of the reference images and the test image during the verification process.

FIG. 18 is a graphic representation of a first alternative for employing the relative location information of the reference images and the test image during the verification process. Since spatial correspondence between the test image and reference image 2 is known and since spatial correspondence between reference image 2 and each of the reference images 1 and 3-5 is known, the spatial correspondences between the test image and all other reference images 1 and 3-5 are then, in principle, also known so that areas of overlap between the test image and the other reference images can be predicted, or estimated. All the other reference images 1 and 3-5 can be placed roughly on top of the test image and a quick check can be performed to determine if they match where they are supposed to. By matching the test image to the other reference images in this manner, the matching process will be faster as the system need not search each reference image in its entirety for a match.

Figure 19:
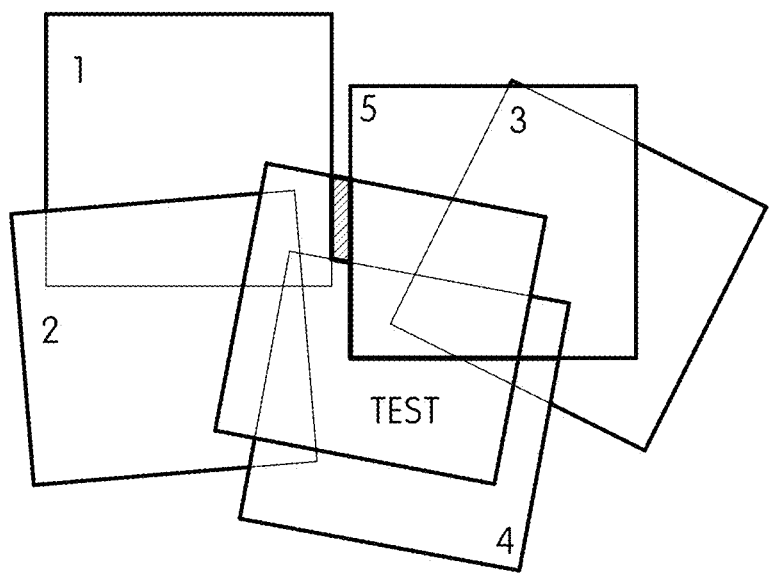
FIG. 19 is a graphic representation of a second alternative for employing the relative location information of the reference images and the test image during the verification process.

FIG. 19 is a graphic representation of a second alternative for employing the relative location information of the reference images and the test image during the verification process. The test image is matched against all other reference images 1-5 without using the relative location information from the enrollment process. When the matching is completed, a consistency check is performed where the known relative locations between the reference images are checked against their relative placements after matching the test image. In the example shown in FIG. 19, the matching between the test image and reference image no. 3 is not consistent with the relative location information from the enrollment process, which, in the illustrated matching process, leaves a perceived gap—shown in cross-hatching—where the test image does not match any of the reference images. This may result in a matching score that will then be a bit lower but not by much since the entire test image is still very well matched by the remaining four template images 1-2 and 4-5. Only the hatch region of the test image is not matched to any reference image.

A further alternative would be to not us relative location information during the verification process, in which case the relative location information may be discarded or not stored in the enrollment process.

EXEMPLARY EMBODIMENTS

Embodiment 1

A biometric identification method comprising storing a plurality of reference biometric images of an organic tissue of a user in a reference database, wherein each of the reference biometric images has a predefined image size and at least partially overlaps at least one of the other reference biometric images, and wherein all of the reference biometric images arranged with their overlapping portions aligned has an area greater than the predefined image size.

Embodiment 2

The method of embodiment 1, wherein storing the reference biometric images comprises: providing a plurality of sample biometric images of the predefined image size from the user; comparing each of the sample biometric images with the other sample biometric images to identify overlapping data in the sample biometric images; computing an amount of unique, non-overlapping data in the sample biometric images; computing an amount of unique data relative to the predefined image size; arranging the plurality of biometric images with their overlapping portions aligned and computing the area of a bounding border encompassing the arranged biometric images relative to the predefined image size; and storing at least a portion of the plurality of sample biometric images as a plurality of reference biometric images in the reference database.

Embodiment 3

The method of Embodiment 2, wherein the plurality of reference biometric images stored in the reference database comprises of number of biometric images that results in the amount of unique data relative to the predefined image size being equal to or greater than a first predefined threshold, and the area of the bounding border encompassing the arranged biometric images relative to the predefined image size is equal to or greater than a second predefined threshold.

Embodiment 4

The method of Embodiment 3, further comprising computing compactness of the plurality of reference biometric images as the amount of unique data relative to the predefined image size divided by the area of the bounding border encompassing the arranged biometric images relative to the predefined image size.

Embodiment 5

The method of Embodiment 4, further comprising comparing the compactness with a third predefined threshold.

Embodiment 6

The method of any one of Embodiments 1-5, wherein providing the sample biometric images comprises generating the sample biometric images with a biometric sensor.

Embodiment 7

The method of any one of Embodiments 1-6, wherein the organic tissue comprises a finger surface and wherein each reference biometric image comprises a fingerprint image, a feature set corresponding to the fingerprint image, or a combination of the fingerprint image and the feature set corresponding to the fingerprint image.

Embodiment 8

The method of any one of Embodiments 1-7, wherein storing the reference biometric images comprises (i) providing a sample biometric image; (ii) providing an additional sample biometric image; (iii) comparing the additional sample biometric image with each previously-provided sample biometric image to identify overlapping data in the additional sample biometric image and each previously-provided sample biometric image; (iv) computing one or more quality measures relating to the additional sample biometric image and each previously-provided sample biometric image; (v) comparing each computed quality measure with a threshold value associated with that quality measure; (vi) repeating steps (ii) through (v) until each quality measure meets or exceeds the associated threshold value; and (vii) storing the sample biometric images as reference biometric images when each quality measure meets or exceeds the associated threshold value.

Embodiment 9

The method of Embodiment 8, wherein the quality measure comprises an amount of unique, non-overlapping data in the additional sample biometric image and each previously-provided sample biometric image, and computing an amount of unique data relative to the predefined image size.

Embodiment 10

The method of Embodiment 8, further comprising arranging the additional sample biometric image and each previ-

19 ously-provided sample biometric image with their overlapping portions aligned, and wherein the quality measure comprises the area of the bounding border encompassing the arranged biometric images relative to the predefined image size.

Embodiment 11

The method of any one of Embodiments 1-10, further comprising storing relative location information for two or more of the plurality of reference biometric images in the reference database.

Embodiment 12

The method of any one of Embodiments 1-11, further comprising: comparing a test biometric image with one or more of the reference biometric images to identify overlapping data in the test biometric image and each of the one or more reference biometric images; computing a cumulative amount of overlapping data in the test biometric image and the one or more reference biometric images; and verifying the user's identity based on the cumulative amount of overlapping data in the test biometric image and all of the reference biometric images.

Embodiment 13

The method of Embodiment 12, further comprising generating the test biometric image with a biometric sensor.

Embodiment 14

The method of Embodiment 12, wherein the organic tissue comprises a finger surface and the test biometric image comprises a fingerprint image.

Embodiment 15

The method of Embodiment 12, further comprising verifying the user's identity based on the number of reference biometric images with which the test biometric image has overlapping data.

Embodiment 16

A method for verifying a user's identity based on a comparison of a test biometric image of a predefined image size obtained from the user with reference biometric image data stored in a reference database, the method comprising: comparing the test biometric image with one or more of the reference biometric images to identify overlapping data in the test biometric image and each of the one or more reference biometric images; computing a cumulative amount of overlapping data in the test biometric image and the one or more reference biometric images; and verifying the user's identity based on the cumulative amount of overlapping data in the test biometric image and all of the reference biometric images.

Embodiment 17

The method of Embodiment 16, further comprising generating the test biometric image with a biometric sensor.

20

Embodiment 18

The method of any one of Embodiment 16 or 17, wherein the organic tissue comprises a finger surface and the test biometric image comprises a fingerprint image.

Embodiment 19

The method of any one of Embodiments 16-18, wherein the organic tissue comprises a finger surface and wherein each reference biometric image comprises a fingerprint image, a feature set corresponding to the fingerprint image, or a combination of the fingerprint image and the feature set corresponding to the fingerprint image.

Embodiment 20

The method of any one of Embodiments 16-19, further comprising verifying the user's identity based on the number of reference biometric images with which the test biometric image has overlapping data.

Embodiment 21

A method for verifying a user's identity based on a comparison of a test biometric image obtained from the user with reference biometric data stored in a reference database, wherein the reference biometric data comprises a plurality of reference biometric images of different portions of a surface of an organic tissue of the user, wherein each reference biometric image partially overlaps at least one other reference biometric image, and wherein the reference biometric data further comprises relative location information between each reference biometric image and at least one other reference biometric image, the method comprising: comparing the test biometric image with one or more of the reference biometric images to identify a matching reference image having overlapping data with the test biometric image; determining relative location information between the test biometric image and the matching reference image; estimating areas of overlap between the test biometric image and the remaining reference biometric reference images based on the relative location information between the test biometric image and the matching reference image and the relative location information of the reference biometric data; and determining an amount of matching between the test biometric image and each of the remaining reference biometric images in each estimated area of overlap.

Embodiment 22

The method of Embodiment 21, further comprising: computing a cumulative amount of overlapping data in the test biometric image and the reference biometric images; and verifying the user's identity based on the cumulative amount of overlapping data in the test biometric image and all of the reference biometric images.

Embodiment 23

The method of Embodiment 21 or 22, further comprising generating the test biometric image with a biometric sensor.

Embodiment 24

The method of any one of Embodiments 21-23, wherein the organic tissue comprises a finger surface and the test biometric image comprises a fingerprint image.

Embodiment 25

The method of any one of Embodiments 21-24, further comprising verifying the user's identity based on the number of reference biometric images with which the test biometric image has overlapping data.

Embodiment 26

A method for verifying a user's identity based on a comparison of a test biometric image obtained from the user with reference biometric data stored in a reference database, wherein the reference biometric data comprises a plurality of reference biometric images of different portions of a surface of an organic tissue of the user, wherein each reference biometric image partially overlaps at least one other reference biometric image, and wherein the reference biometric data further comprises relative location information between each reference biometric image and at least one other reference biometric image, the method comprising: comparing the test biometric image with each of the reference biometric images to identify matching reference images having overlapping data with the test biometric image; determining relative location information between the test biometric image and each of the matching reference images; determining relative location information between each of the matching reference images based on the relative location information between the test biometric image and each of the matching reference images; and comparing the relative location information between each of the matching reference images determined based on the relative location information between the test biometric image and each of the matching reference images with the relative location information of the reference biometric data.

Embodiment 27

The method of Embodiment 26, further comprising: computing a cumulative amount of overlapping data in the test biometric image and the reference biometric images; and verifying the user's identity based on the cumulative amount of overlapping data in the test biometric image and all of the reference biometric images.

Embodiment 28

The method of Embodiment 26, further comprising generating the test biometric image with a biometric sensor.

Embodiment 29

The method of Embodiment 26, wherein the organic tissue comprises a finger surface and the test biometric image comprises a fingerprint image.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method for verifying a user's identity from a test biometric image obtained from the user, the method comprising:
(A) comparing the test biometric image provided by an imaging device with reference biometric data stored in a reference database, wherein the reference biometric data comprises a plurality of reference biometric images of different portions of a surface of an organic tissue of the user, wherein each reference biometric image partially overlaps at least one other reference biometric image, and wherein the reference biometric data further comprises relative location information between each reference biometric image and at least one other reference biometric image, and wherein comparing the test biometric image with reference biometric data comprises using a matching algorithm to compare the test biometric image with each of the reference biometric images to identify matching reference images having overlapping data with the test biometric image;
(B) determining spatial correspondence between the test biometric image and each of the matching reference images identified in step (A);
(C) determining spatial correspondence between each of the matching reference images identified in step (A) based on the spatial correspondence determined in step (B);
(D) comparing the spatial correspondence determined in step (C) with the relative location information of the reference biometric data;
(E) computing a cumulative amount of overlapping data in the test biometric image and the reference biometric images as determined in step (A); and
(F) verifying the user's identity based on the cumulative amount of overlapping data in the test biometric image and all of the reference biometric images as determined in step (E).

2. The method of claim 1, further comprising generating the test biometric image with a biometric sensor.

3. The method of claim 1, wherein the organic tissue comprises a finger surface and the test biometric image comprises a fingerprint image.

* * * * *